G. D. HARRIS.

CENTRIFUGALLY GOVERNED CLUTCH PULLEY.

APPLICATION FILED MAR. 25, 1920.

Reissued May 18, 1920.

14,857.

Witnesses

J. L. Ingram

Charles W. Hill Jr.

Inventor

Grover D. Harris by Charles W. Hill Atty

UNITED STATES PATENT OFFICE.

GROVER D. HARRIS, OF MENASHA, WISCONSIN, ASSIGNOR TO U. S. TRACTOR & MACHINERY COMPANY, A CORPORATION OF WISCONSIN.

CENTRIFUGALLY-GOVERNED CLUTCH-PULLEY.

14,857. Specification of Reissued Letters Patent. Reissued May 18, 1920.

Original application filed June 25, 1915, Serial No. 36,170. Renewed February 11, 1918, Serial No. 216,648. Original No. 1,284,192, dated November 5, 1918. Application for reissue filed March 25, 1920. Serial No. 368,683.

*To all whom it may concern:*

Be it known that I, GROVER D. HARRIS, a citizen of the United States, residing at Menasha, in the county of Winnebago and State of Wisconsin, have invented new and useful Improvements in Centrifugally-Governed Clutch-Pulleys, of which the following is a specification.

My invention relates to improvements in centrifugally governed clutch pulleys, the object of which is to provide means for governing a side bearing friction clutch by centrifugal force and to house the governing members within the pulleys, thereby producing a compact simple structure, self governing, and in which the controlling weights are so housed in, that even if dislodged while the clutch is in operation, they cannot be thrown away from the pulley.

In the drawings.

Like parts are identified by the same reference characters throughout the several views.

Figure 1:
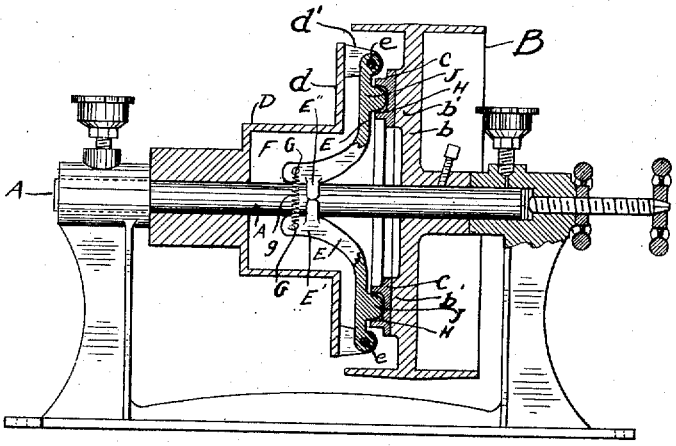
Figure 1 is a sectional view of a clutch pulley embodying my invention, drawn to a vertical plane exposing the supporting shaft.
Figure 2:
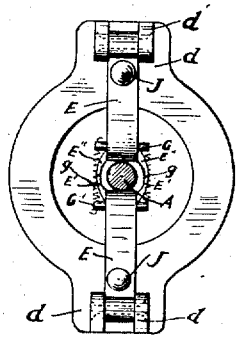
Fig. 2 is a detail view, showing the driven member from its inner face, the shaft being shown in cross section.
Figure 3:
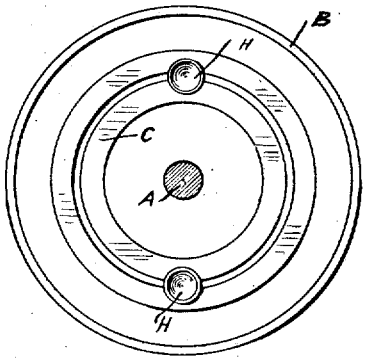
Fig. 3 is an opposing view of the driving member, also showing the shaft in cross section.

The shaft A is provided with a pulley B, the web *b* of which is provided with an annular projection *b'*, the side surface of which is faced off to form a bearing for a clutch ring C. A second pulley member D is provided with radially projecting portions *d* having ears *d'*, between which the centrifugally operating governing levers E are pivoted at *e*. The levers E project inward radially from the pivot pins *e* and the inner ends are curved or elbowed, with the extremities E' extending substantially parallel to the shaft A and in close proximity thereto within a cavity F formed in the member D. These extremities are provided with cross pins G and the cross pins carried by the respective levers are connected on each side of the shaft A by springs *g*.

The clutch ring C is provided with bosses on its outer surface having recesses or pockets H to receive projections J carried by the levers E. These projections J have rounded surfaces which fit loosely into the pockets H, the bases of which are also preferably rounded.

The portions E' of the levers E have sufficient mass to constitute governing weights which are normally held in close proximity to the shaft by the tension of the springs *g*. They are preferably provided on each side of the shaft with mutually engaging stop lugs E'', whereby they are mutually supported out of contact with the shaft A. The tension of the springs *g* tends to draw the portions E' of the levers toward the shaft until these projections E'' engage each other. But said projections E'' will not be brought into contact with each other under normal conditions, since the clutch operating projections J will first engage and press the clutch ring C against the side face of the annulus *b'* carried by the pulley B, thereby transmitting motion frictionally from the pulley B, to the ring C. The rotary movement of the ring C is transmitted to the pulley D through the socketed projections J, the levers E, pivot pins *e*, ears *d'* and flange *d*. But when the speed becomes excessive, the governing weights E' move outwardly by centrifugal force against the tension of the springs *g*, thereby relieving clutch ring C from the pressure of the bearing lugs J and allowing said clutch ring to slip upon the annulus *b'*. Owing to the fact that the levers E are concealed within the member D and the rim of the pulley B, protection is afforded against injury to operatives in case the springs *g* should break or pivot pins *e* become loosened. The device is also improved in appearance by concealing the controlling mechanism.

For the purpose of adjustably controlling the speed at which pulley D will be driven, I mount a manually operated screw in the end of the shaft bearing in axial alinement with the shaft. A tapered point on this screw bears upon the end of the shaft at its axis. By turning up this screw I am able to cause a longitudinal movement of the shaft which will force pulley B in closer contact with floating ring C in opposition to springs *g*. When the pressure is thus increased a greater speed will be necessary to release the driven pulley. A wheel threaded on the adjusting screw serves to lock this screw in any desired position.

I claim:

1. The combination with a pulley provided with an annular member having a friction bearing side face, a ring in frictional bearing contact with said side face, a second pulley provided with an interior cavity, a set of governing levers pivoted upon said second pulley near the rim of the first mentioned pulley and having arms projecting into said cavity adjacent to the axis, and projections on said levers loosely interlocked with said ring.

2. The combination with a pulley provided with an annular member having a friction bearing side face, a ring in frictional bearing contact with said side face, a second pulley provided with an interior cavity, a set of governing levers pivoted upon said second pulley near the rim of the first mentioned pulley and having centrifugally swinging arms projecting inward radially and axially into said cavity, projections on said levers loosely interlocked with said ring, and springs connecting the arms of said levers within said cavity.

3. The combination with a pulley having a portion thereof provided with an annular friction bearing face, a clutch ring adapted to move parallel with the axis of said pulley into and out of contact with said bearing face, a second pulley provided with an interior cavity, a set of governing levers inclosed by the walls of said cavity, and the rim of the first mentioned pulley, said levers being pivoted to said second pulley, connections adapted to transmit movement from said levers to actuate said clutch ring in a direction parallel with the axis of said pulley, and springs adapted to normally hold said levers with the clutch ring in motion transmitting position, said levers being adapted to swing outwardly by centrifugal force under predetermined speed to release said clutch members, substantially as described.

4. The combination with a shaft, of a pulley thereon having a friction bearing annular side face, a clutch ring adapted for frictional bearing contact with said side face, a second pulley provided with an interior cavity, means for connecting one of said pulleys with the shaft, a set of governing levers pivoted upon said second pulley and having arms substantially parallel with and in close proximity to the shaft and adapted to swing outwardly by centrifugal force within said cavity, projections on said levers loosely interlocked with said clutch ring, springs adapted to press the lever arms in the direction of said shaft, and lugs on said arms adapted by mutual engagement to prevent the same from contacting with said shaft, substantially as described.

5. The combination with a shaft, of a pulley provided with an annular member having a friction bearing side face, a ring in frictional bearing contact with said side face, another pulley provided with an interior cavity, a set of governing levers pivoted upon said other pulley and having centrifugally swinging arms projecting into said cavity, projections on said levers loosely interlocked with said ring, and means for connecting one of said pulleys with the shaft.

6. The combination with a shaft, of a pulley provided with an annular member having a friction bearing side face, a ring in frictional bearing contact with said side face, another pulley provided with an interior cavity, a set of governing levers pivoted upon said other pulley and having centrifugally swinging arms projecting into said cavity, projections on said levers loosely interlocked with said ring, means for connecting one of said pulleys with the shaft, and springs adapted to normally hold said levers with the ring in pressure contact with the side face of the first mentioned pulley.

7. The combination with a shaft of a pulley, of an annular bearing plate on the side of the web thereof, a floating ring adapted to bear frictionally on said plate, means for operatively communicating the motion of said ring to a second pulley, centrifugally operated means for varying the friction between the ring and the plate in inverse proportion to the engine speed, and means for also controlling said friction manually, said manually operated means comprising an axially adjustable screw bearing against the axis of the shaft whereby the latter and the pulley mounted thereon may be forced in the direction of the other pulley, thereby increasing the pressure upon the bearing surfaces.

In testimony whereof I have hereunto subscribed my name in the presence of two subscribing witnesses.

GROVER D. HARRIS.

Witnesses:
L. S. Bohn,
J. J. Judwabny.